June 22, 1965   J. PIRINCIN   3,190,280
HEATING APPARATUS
Filed March 11, 1963
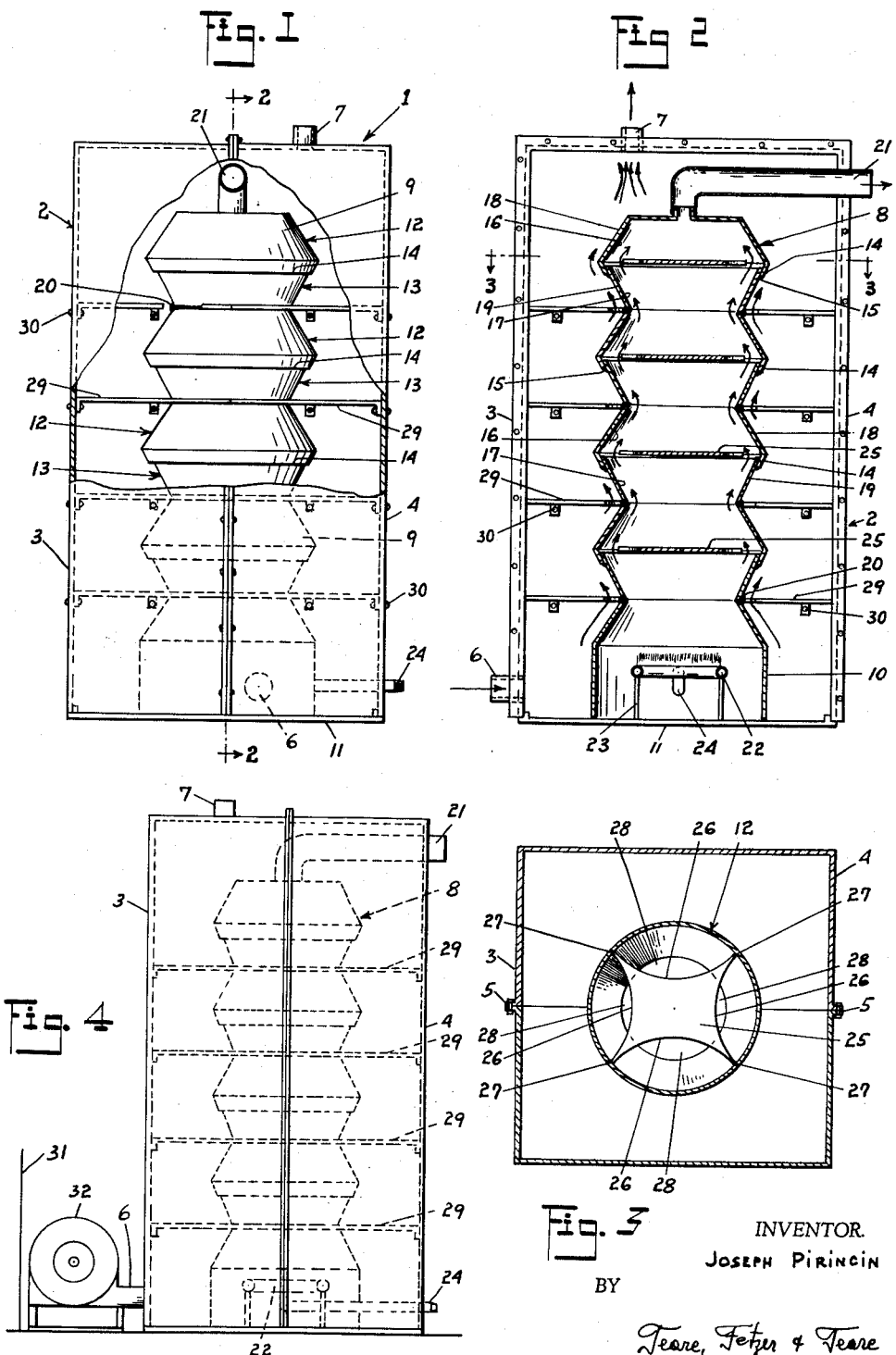
INVENTOR.
JOSEPH PIRINCIN
BY
Teare, Teter & Teare
ATTORNEYS

United States Patent Office 3,190,280
Patented June 22, 1965

3,190,280
HEATING APPARATUS
Joseph Pirincin, 9909 Foster Ave., Cleveland, Ohio
Filed Mar. 11, 1963, Ser. No. 264,402
1 Claim. (Cl. 126—116)

This invention relates to heating apparatus, and more particularly to an air heating apparatus for use with gravity or forced air heating systems.

The general object of the present invention is to provide improved heating apparatus, of the hot air type, wherein the air to be heated therein passes through the heater in a substantially tortuous path, and wherein the products of combustion therein pass through the heater in a substantially tortuous path, and thereby provide a maximum heat exchange from the products of combustion to the air to be heated and with a maximum operating efficiency.

Another object of the present invention is to provide an improved air heater of the aforementioned type which is of simple construction and which may be economically manufactured.

A further object of the present invention is to provide an improved air heater of the aforementioned type which provides a compact, unitary construction, which requires a minimum of floor space, and which may be easily assembled and disassembled for purposes of installation and maintenance.

Other objects and advantages of the invention will be apparent from the following description taken in conjunction with the accompanying drawings wherein:

FIG. 1 is a front elevational view with parts broken away of a heater constructed in accordance with the present invention;

FIG. 2 is a vertical sectional view of the heater of the present invention, the plane of section being indicated by the lines 2—2 of FIG. 1;

FIG. 3 is a horizontal sectional view of the heater of the present invention, the plane of section being indicated by the line 3—3 of FIG. 2; and FIG. 4 is a side elevational view on a reduced scale of a modified form of the present invention which is particularly adapted for use in connection with forced air type heating systems.

In general, the present invention, briefly described, provides a heating apparatus, of the hot air type, which includes an outer casing with inlet and outlet openings therein for the passage of air to be heated through the heater. A vertically extending bellows-shaped combustion chamber is disposed centrally within the casing having a fuel burner adjacent one end thereof, and a plurality of horizontally extending baffle plates therein and spaced from one another and from the interior surfaces of the combustion chamber, for controlling the flow of products of combustion in a generally tortuous path through the heater. A plurality of horizontally extending deflector plates project from the respective sides of the casing and are spaced from one another, and from the exterior surfaces of the bellows-shaped combustion chamber for controlling the flow of air to be heated in a generally tortuous path through the heater and out through the outlet opening in the casing, as aforesaid.

Referring now more particularly to FIGS. 1 to 3 of the drawings, the improved air heater designated generally at 1 is illustrated as a gravity heater and as comprising a vertically extending casing 2 of suitable dimensions and material, such as sheet metal. The casing 2 may be either circular or substantially square shaped in plan and is preferably made in two identical halves or mating sections 3 and 4 detachably joined together by suitable bolts 5, such that the heater may be quickly assembled and disassembled to facilitate cleaning and maintenance thereof. The lower end of the casing is provided with a suitable inlet opening 6, such that cold air to be heated may be passed into the heater, while the upper end of the casing 2 is provided with an outlet opening 7 for discharging the thus heated air from within the heater.

Mounted centrally within the casing 2 is a vertically extending bellows-shaped combustion chamber designated generally by the reference character 8. The combustion chamber 8 preferably includes a plurality of concentrically disposed, axially aligned flues 9 juxtaposed on top of one another and supported on a firebox 10. The firebox 10 serves to space the flues 9 from the base 11 of the heater and forms a conduit for the products of combustion. In the embodiment illustrated, the flues 9 are preferably of identical construction, each of which includes a pair of dish-shaped, generally circular in plan (FIG. 3) upper 12 and lower 13 sections which are joined together by means of a generally L-shaped circumferentially extending flange 14 which extends from the upper section 12 and which may be integrally joined to the confronting marginal edge of the lower section 13 by means of suitable weldments 15. Thus assembled, each of the respective flues 9 defines a generally elongated bellows-shaped configuration in vertical cross-section (FIG. 2) which provides a pair of oppositely-inclined generally annular reflecting surfaces 16 and 17 on the interior of the flue, and a corresponding pair of oppositely inclined annular reflecting surfaces 18 and 19 on the exterior of the flue. Thus, it will be seen that such construction affords the maximum absorbing and heat transfer surface area within the combustion chamber 8 for conducting heat from the products of combustion to the air to be heated.

In the form illustrated, the respective juxtaposed flues 9 are open at the top and bottom and are preferably joined together, such as by suitable weldments 20, to provide the aforementioned bellows-shaped combustion chamber 8. One end of the combustion chamber communicates with the firebox 10 and the other end of the chamber communicates with an outlet conduit 21 attached to the uppermost flue for discharging products of combustion from the chamber 8. A fuel burner 22 is mounted on a support 23 and is positioned adjacent the lower end of the combustion chamber within the firebox 10. The burner is illustrated diagrammatically as a type utilizing gas as a fuel, and thus is provided with a gas inlet conduit 24 which extends exteriorly of the heater.

The products of combustion passing upwardly through the combustion chamber 8 are deflected by a plurality of horizontally extending baffle plates 25, one of which is disposed intermediate the upper 12 and lower 13 sections constituting each of the respective flue segments 9. The baffle plates 25 are preferably made of relatively flat strips of sheet metal, generally square-shaped in plan, and being cut-out along four sides thereof to provide oppositely disposed generally concave edges 26 along such four sides (FIG. 3). Each of the baffle plates 25 has its four corners attached to the side walls of the respective flues 9, as at 27, such that the concave edges 26 of each baffle plate are spaced from the opposite surface of the flue to provide vertically extending openings 28 therewith for the passage of products of combustion through the heater.

The baffle plates 25 are spaced vertically from one another and coact with the interior surfaces of the bellows-shaped combustion chamber 8 to provide tortuous passageways for the flow of heat and the products of combustion, which passageways extend from the burner 22 to the outlet opening 21 adjacent the top of the combustion chamber, as shown by the solid arrows in FIG. 2. As the heat and products of combustion ascend in a serpentine form following a generally tortuous path upwardly through the combustion chamber 8, they are deflected from the under surfaces of the baffle plates 25 against the oppositely-inclined interior surfaces 16 and 17 within each of the respective flues 9, thus effectively communicating heat over the greatest exposed surface area within the chamber as the products of combustion pass upwardly to the outlet opening 21.

Projecting inwardly from the respective side walls of the casing 2 are a plurality of horizontally extending side deflectors 29 for controlling the flow of air to be heated as it passes through the heater. The deflectors 29 may be made from a unitary strip of sheet metal or may be made in four separate sections and attached to the respective side walls of the casing 2 by suitable bolts 30. In the form illustrated, the deflectors 29 are spaced vertically from one another and alternately relative to the baffle plates 25, such that their horizontally extended planes pass through the juncture between the respectiev juxtaposed flues 9.

Each of the deflectors 29 extends inwardly from the opposite side wall of the casing 2 toward the combustion chamber 8 but is spaced from the oppositely-inclined exterior surfaces 18 and 19 of its respective flue to provide a generally tortuous passageway for the air to be heated through the heater. The tortuous passageway extends from the inlet opening 6 to the outlet opening 7 in the casing. As the air to be heated ascends through the heater, it is deflected by the aforementioned deflector plates 29 against the oppositely-inclined exterior surfaces 18 and 19 of the respective flues 9, thus effectively absorbing the maximum amount of heat from the greatest exposed surface area of the combustion chamber 8 in passing upwardly and out of the outlet opening 7 in the casing.

In a typical application of the present invention, the products of combustion from the burner 22 rise through the bellows-shaped combustion chamber 8 in continuous tortuous paths around the interior baffle plates 25 until the products of combustion ultimately pass out through the outlet opening 21 and into a suitable chimney or the like (not shown). Similarly the air to be heated flows upwardly through the heater in a continuously tortuous path around the exterior side deflectors 29 until the air thus heated is ultimately passed out through the outlet opening 7 adjacent the top of the heater.

In FIG. 4 of the drawings, the improved heater of the present invention is illustrated in connection with a forced air heating system. In this embodiment of the invention, the casing 2, bellows-shaped combustion chamber 8, burner 22, baffle 25 and deflector 29 construction are substantially the same as heretofore described in connection with FIGS. 1 to 3 of the drawings. In this form, however, the casing 2 is provided with an inlet manifold 31 which forms an inlet conduit for air to be heated. The manifold may be provided with a suitable blower 32 which forces air to be heated from the surrounding environment into the inlet 6 in a continuous tortuous path through the heater and out through the outlet opening 7, thereby to accomplish the maximum heat exchange in accordance with the principles of the present invention.

Through for purposes of disclosure, the juxtaposed flues which extend vertically through the heater have been illustrated as generally circular in plan, it is to be understood that other various shapes and/or configurations such as square, rectangular, hexagonal, etc. are also contemplated in the present invention. Similarly, though four such flues have been illustrated juxtaposed on top of one another, it is to be understood that any number of such flues may similarly be utilized in accordance with the present invention depending upon the size and heating requirements in a particular installation of the heater.

From the foregoing description and accompanying drawings, it will be apparent that the present invention provides an improved air heater which is of a simple, compact, unitary construction and which may be readily assembled and disassembled for purposes of installation and maintenance. The heater of the present invention provides a construction wherein the air to be heated will encounter the greatest possible heating surface to provide a maximum heat exchange from the products of combustion. Such construction provides a maximum burner efficiency with the result that the heater of the present invention may be operated with a minimum cost which greatly enhances its commercial application and usability.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

I claim:

In a hot air heater, the combination comprising a hollow, substantially closed metal casing having inlet and outlet means for the passage of air to be heated through the heater, a vertically extending, generally bellows-shaped combustion chamber disposed in centrally spaced relationship within said casing, a fuel burner mounted within and adjacent the bottom of said chamber, outlet means adjacent the top of said chamber and extending through said casing for the discharge of products of combustion from said chamber, said chamber including a plurality of superposed generally circular, in plan, flues to provide a heat exchange reservoir for the products of combustion, each of said flues including upper and lower frusto-conical members attached together at their widest diameter, the opposed frusto-conical members between respective of said flues being attached together at their smallest diameter to provide a unitary, single walled structure for the passage of combustion products therethrough, each of said flues including horizontally extending baffle means disposed in the plane of the widest diameter of said flues, each of said baffle means including a flat, substantially square, sheet metal plate engageably attached at four corners thereof to the confronting interior surface of the respective flue, each of said baffle plates being provided with cut-out portions defining concave edges between said corners thereof which coact with the confronting interior surfaces of said flues to provide tortuous passageways therewith for the products of combustion from the burner to the outlet means from said chamber, and a plurality of superposed deflector means extending horizontally inwardly from said casing, each of said deflector means including a flat, sheet metal plate disposed in the plane of the smallest diameter of said flues and hence alternately relative to said baffle plates, said deflector plates extending into proximity with but spaced from the confronting exterior surface of said flues to provide tortuous passageways for the air to be heated from the inlet means to the outlet means through said casing.

References Cited by the Examiner
UNITED STATES PATENTS

| | | | |
|---|---|---|---|
| 268,083 | 11/82 | Detwiler | 126—90 |
| 685,581 | 10/01 | Dellinger | 126—116 |
| 786,300 | 4/05 | Laberge | 126—116 |
| 1,464,210 | 8/23 | Marx. | |
| 1,578,546 | 3/26 | Myers | 126—110 X |
| 2,141,649 | 12/38 | Grill et al. | 126—118 X |
| 2,286,688 | 6/42 | Roth | 110—97 |

JAMES W. WESTHAVER, *Primary Examiner.*